United States Patent [19]
Rush

[11] Patent Number: 5,394,335
[45] Date of Patent: Feb. 28, 1995

[54] RETROFIT AUTO-INDEXING SYSTEM

[75] Inventor: James D. Rush, Fontana, Calif.

[73] Assignee: Amada Engineering & Service Co., Inc., La Mirada, Calif.

[21] Appl. No.: 40,593

[22] Filed: Mar. 31, 1993

[51] Int. Cl.6 .............................. G06F 15/46
[52] U.S. Cl. ............................. 364/474.21; 364/476; 364/474.02; 364/474.11
[58] Field of Search ............ 364/474.21, 476, 474.02, 364/474.11; 74/813 C; 51/166 T; 29/39, 40; 318/571

[56] References Cited

U.S. PATENT DOCUMENTS

| | | | |
|---|---|---|---|
| 4,074,350 | 2/1978 | Roch et al. | 364/474.22 |
| 4,092,720 | 5/1978 | Carey | 364/474.11 |
| 4,285,259 | 8/1981 | Jelinek et al. | 83/552 |
| 4,302,870 | 12/1981 | Schalles et al. | 29/40 |
| 4,343,210 | 8/1982 | Kuroyone | 83/71 |
| 4,376,970 | 3/1983 | Ilseman et al. | 364/167.01 |
| 4,412,469 | 11/1983 | Hirata et al. | 83/552 |
| 4,486,840 | 12/1984 | Klein et al. | 364/476 |
| 4,488,237 | 12/1984 | Aronson et al. | 364/476 |
| 4,510,570 | 4/1985 | Yonekura | 364/476 |
| 4,511,976 | 4/1985 | Graf | 364/476 |
| 4,527,244 | 7/1985 | Graham, Jr. et al. | 364/474.35 |
| 4,532,845 | 8/1985 | Jinnouchi | 83/552 |
| 4,535,277 | 8/1985 | Kurakake | 318/561 |
| 4,543,636 | 9/1985 | Noda et al. | 364/474.21 |
| 4,611,155 | 9/1986 | Kurakake | 318/603 |
| 4,616,322 | 10/1986 | Niwa et al. | 364/474.21 |
| 4,622,504 | 11/1986 | Yamazaki | 318/561 |
| 4,785,513 | 11/1988 | Lee et al. | 29/40 |
| 4,819,311 | 4/1989 | Hashimoto et al. | 29/40 |
| 4,847,960 | 7/1989 | Hafla et al. | 29/40 |
| 4,872,244 | 10/1989 | Schleich | 29/40 |
| 4,922,595 | 5/1990 | Hattori et al. | 29/40 |
| 4,933,868 | 6/1990 | McMurtry . | |
| 5,010,286 | 4/1991 | Nakamura et al. | 318/571 |
| 5,010,492 | 4/1991 | Kurakake et al. | 364/474.29 |
| 5,020,210 | 6/1991 | Fujimoto | 29/568 |
| 5,044,239 | 9/1991 | Endo et al. | 83/133 |
| 5,050,468 | 9/1991 | Nydigger | 82/1.11 |
| 5,075,961 | 12/1991 | St. Hilaire | 29/739 |
| 5,093,973 | 3/1992 | Steinbach | 29/39 |

Primary Examiner—Paul Gordon
Attorney, Agent, or Firm—Wigman, Cohen, Leitner & Myers

[57] ABSTRACT

A retrofit auto-indexing system for a turret punch press is described in which a predetermined location is provided to which both the upper and lower turrets of a non-indexing turret punch press are rotated. Upper and lower punching tools are mounted respectively in the upper and lower turrets in such a manner so as to be rotated simultaneously, using a single servomotor, to a desired angle. The auto-indexing system is controlled using a microcomputer which is connected to receive the numerical control programmed data, determine whether the code it is receiving relates to the auto-indexing function and, when it does, institute the instructed auto-indexing function. Otherwise, the microcomputer passes the numerical control programmed data directly to a minicomputer which operates the turret punch press in a known manner.

11 Claims, 4 Drawing Sheets

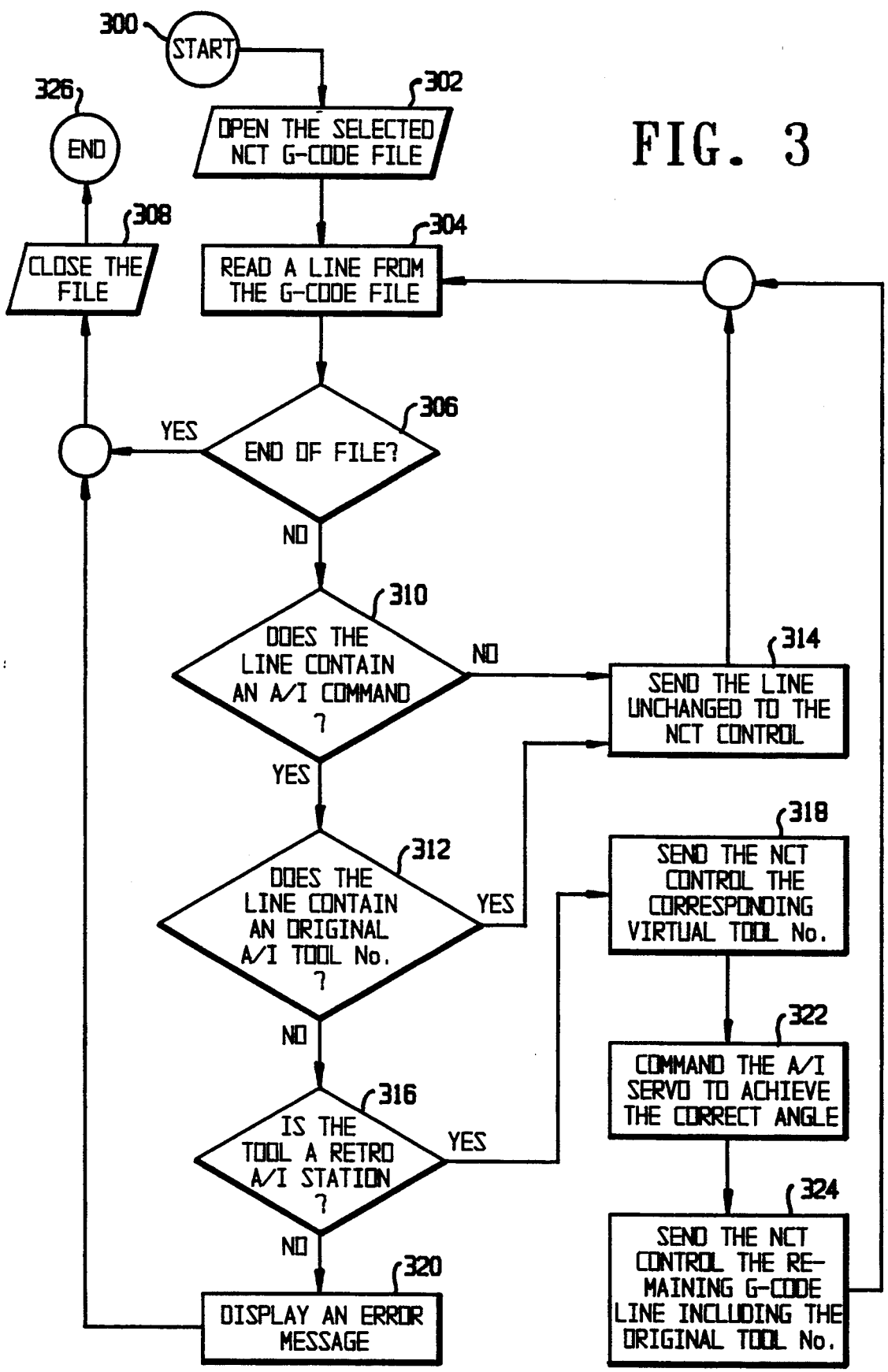

RETROFIT AUTO-INDEXING SYSTEM

BACKGROUND OF THE INVENTION

The present invention relates generally to turret punch presses having a pair of upper and lower turrets on which a plurality of pairs of upper and lower punching tools can be mounted to punch a variety of holes in sheet materials, such as sheet metals. More particularly, the present invention relates to a system and method which can be retrofitted to such turret punch presses which provides for the synchronous indexing or rotating of the upper and lower punching tools in the upper and lower punching turrets in order to make the best use of the punching tools.

As is well known, a turret punch press comprises a vertically movable ram and a pair of rotatable upper and lower turrets for holding a plurality of upper and lower punching tools which are varied in size and shape to punch a variety of holes in sheet materials, such as sheet metals. The upper and lower turrets are substantially vertically spaced from each other beneath the ram. The turrets are horizontally disposed on their respective shafts which are vertically disposed so as to coaxially align with each other.

Each of the punching tools on the upper turret is so located as to vertically align with the lower punching tools on the lower turret so as to cooperate with each other to punch holes of a particular shape. The upper and lower turrets are so arranged as to be simultaneously power rotated to bring a desired pair of the upper and lower tools into position beneath the ram so as to enable them to be worked by the ram to punch holes of a desired shape. In such an arrangement, a workpiece, such as a piece of sheet metal to be punched, is horizontally fed by a plurality of clamping means into position between the upper and lower turrets. The punching is accomplished by the upper and lower punching tools which have been placed beneath the ram by the upper and lower turrets.

The clamping devices are arranged so that they grip an end of the workpiece and are moved by power along both the X and Y axes in all directions toward and away from the upper and lower turrets. That brings any portion of the workpiece into position beneath the ram. In order to automatically and continuously punch a number of holes which vary in size and shape in the workpiece, the upper and lower turrets and the clamping devices are arranged to be rotated and moved under a preprogrammed numerical control.

During punching operations in the types of turret punch presses described above, it is often desirable to punch a plurality of holes within the workpieces which are all the same in size and shape but which have different directions. For example, there are instances where it is desirable to punch many holes in a workpiece of T-shape and inverted T-shape. These holes are identical in shape and size but differ in direction. As another example, it is often necessary to punch a plurality of Y-shaped holes, which are identical in shape and size, but at different angles to an edge of the workpiece, in order to punch a radial shape in the workpiece. There are also cases in which it is desirable to punch holes of identical shape and size in one direction in some workpieces and in different directions in other workpieces.

In conventional turret punch presses, however, it has been impossible to satisfactorily punch holes identical in shape and size but in different directions in workpieces in an economical manner. For example, in order to punch holes in different directions in workpieces, a desired pair of the upper and lower punching tools of a desired shape and size must be manually adjusted in direction in the upper and lower turrets in a conventional turret punch press. It is, however, very difficult and time-consuming to accurately align the upper and lower punch tools in a desired direction in the upper and lower turrets in this manner. Thus, for the purpose of easy alignment, each of the upper and lower punch tools is provided with an alignment key. Each of the upper and lower turrets is also configured with a plurality of grooves in which the alignment key is selectively engaged in some of these conventional punch presses.

In that manner, however, it is of course impossible to steplessly adjust the direction of the upper and lower punching tools in the upper and lower turrets in order to punch holes common in size and shape in all directions in workpieces. It is, also, still time-consuming and troublesome to manually change the direction of the upper and lower punching tools in the upper and lower turrets. Furthermore, such an arrangement is costly and requires a plurality of grooves in the upper and lower turrets. However, such prior art turret punch presses have the great disadvantage that it is impossible to continuously punch holes which are identical in shape and size and different in direction without discontinuing the punching operation in turret punch presses in which the upper and lower punching tools have to be manually changed in direction in the upper and lower turrets. Therefore, in order to punch holes different in direction in workpieces in that manner, it is necessary to discontinue the punching operation to change the direction of the upper and lower punching tools after having punched holes common in direction.

For those reasons, it has often been the case that many pairs of upper and lower punching tools which are of the same size and shape are mounted together on the upper and lower turrets in order to continuously punch a variety of holes, including those which have a common shape and size and which are different only in direction. However, that approach to solving the problem has resulted in upper and lower tools which are more costly than they otherwise would have to be. In addition, only a limited number of pairs of upper and lower punching tools can be mounted on the upper and lower turrets.

U.S. Pat. No. 4,412,469, to Hirata et al., addresses the problems of the types of turret punch presses described above. That patent discloses a turret punch press in which the upper and lower turrets are synchronously rotatable such that the upper and lower punching tools may be synchronously rotated or indexed in order to punch holes of the same size and shape, but of different orientation, in workpieces. In that patent, the upper and lower punching tools are rotatably mounted on the upper and lower turrets and provided with driving means for synchronously rotating the upper and lower punching tools. A clutch and a brake are provided for automatically fixing the upper and lower punching tools within the upper and lower turrets, respectively. Thus, the turret punch press disclosed in the Hirata et al. patent provides upper and lower punching tools which can be automatically synchronously rotated or indexed in the upper and lower turrets under numerical control in order to continuously punch a variety of holes including those which are identical in shape and size and different in direction.

However, there are still a great many turret punch presses in which it is desirable that the upper and lower punching tools be synchronously rotated or indexed in order to punch holes of the same size and shape, but of different orientation, in the workpieces. Therefore, there is believed to be a great need in the art for a system and apparatus for retrofitting to such prior art turret punch presses an automatic indexing system such that at least one upper and one lower punching tool may be synchronously rotated or indexed in order to punch holes of the same size and shape, but different orientation, in the workpiece. In addition, in turret punch presses which already have an auto-indexing capability, it may still be desirable to add an additional tool changer having an auto-indexing capability.

SUMMARY AND OBJECTS OF THE INVENTION

In view of the foregoing, it should be apparent that there still exists a need in the art for a system and apparatus for retrofitting existing turret punch presses such that they can take advantage of the auto-indexing technology which is available in some of the new turret punch presses.

More particularly, it is an object of this invention to provide a system and apparatus for accomplishing the retrofit to non-indexing turret punch presses of auto-indexing capabilities by adding an auto-indexing station for non-auto-indexing turret punch presses.

Still more particularly, it is a further object of this invention to retrofit additional auto-indexing stations to a turret punch press which already has an auto-indexing capability in order to increase the operating flexibility of the turret punch press.

Briefly described, these and other objects of the invention are accomplished in accordance with its apparatus aspects by providing a special location to which both the upper and lower turrets of a non-indexing turret punch press are indexed. The upper and lower turrets are secured at this special location by means of a set of shot pins. Upper and lower punching tools are mounted respectively in the upper and lower turrets in such a manner so as to be rotated simultaneously, using a single motor, to any angle with a resolution of 0.01 degrees. When not indexing, the tools are held securely in place by means of a brake or other suitable means.

When operating, the retrofitted at least one auto-indexing station contained on both the upper and lower turrets is turned to an indexing station. The punch and die tools are then rotated simultaneously to the desired angle and then secured in place. The upper and lower turrets are then rotated back to a position beneath the ram.

The auto-indexing system of the present invention is controlled utilizing a microcomputer which is connected to receive the numerical control program data. The microcomputer determines whether the code it is receiving relates to the auto-indexing function. When an auto-indexing command is intercepted, the microcomputer is used to control the auto-indexing servomotor.

When the microcomputer determines that it has received normal program code intended for the normal turret punch press controller, it supplies that code directly to that controller, with no changes to the code, and takes no further action.

With these and other objects, advantages and features of the invention that may become hereinafter apparent, the nature of the invention may be more clearly understood by reference to the following detailed description of the invention, the appended claims, and to the several drawings attached herein.

BRIEF DESCRIPTION OF THE DRAWINGS

FIG. 3 is a diagram of a flowchart of a program for use with the apparatus of the present invention;

DETAILED DESCRIPTION OF THE PREFERRED EMBODIMENT

Figure 1:
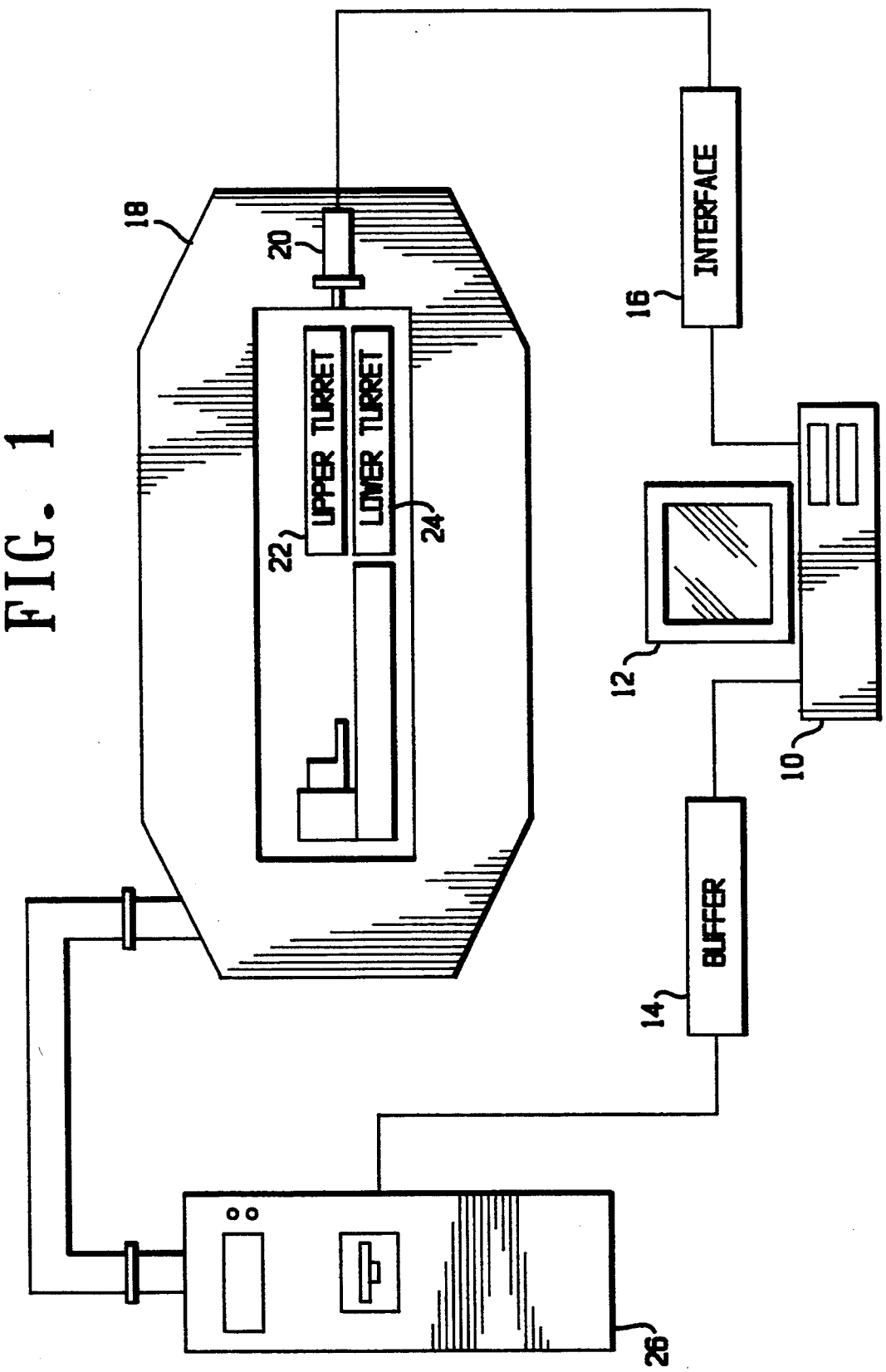
FIG. 1 is a schematic block diagram showing the apparatus of the present invention.
Figure 2:
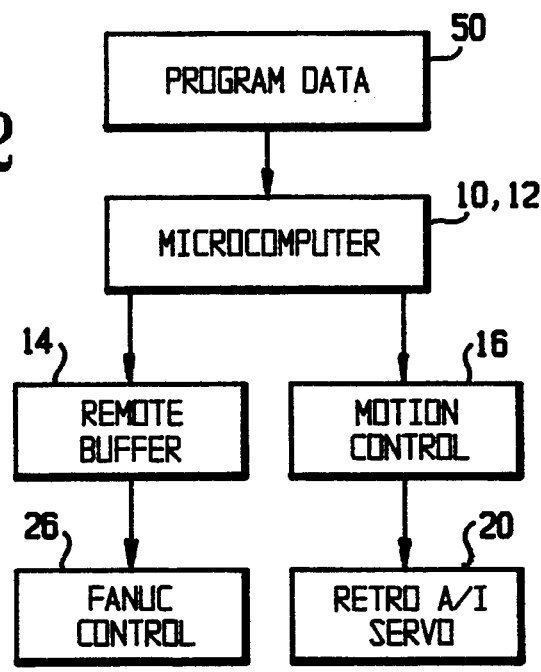
FIG. 2 is a schematic block diagram of the control apparatus used in connection with the present invention.

Referring now in detail to the drawings wherein like parts are designated by like reference numerals throughout, there is illustrated in FIG. 1 a typical turret punch press 18 having an upper turret 22 for carrying a number of punches and a lower turret 24 for carrying a like number of dies. A microcomputer 10 with an associated video display tube 12 is connected to operate the retrofit auto-indexing system of the present invention, as will be described in more detail hereinafter. The microcomputer 10 may preferably be an IBM-compatible computer having an 80386DX-33 or equivalent microprocessor having 4 megabytes of RAM memory, a 40 megabyte hard disk drive, a 1.44 megabyte floppy disk drive, two or more RS-232C ports, at least one parallel port, 25 discrete digital inputs and 25 discrete digital outputs.

The microcomputer 10 is connected through a motion control device 16 to the auto-indexing servomotor 20 which is used to align the auto-indexed tools, as described in more detail hereinafter and in connection with FIG. 4.

The motion control device will preferably be a Galil Model DMC-610, having one or more of the RS-232C, RS-422, IEEE 488 or PC-BUS interfaces, four discrete inputs and four discrete outputs, battery-backed 8 kilobytes of memory and a resolution of 4,000 steps per revolution. Such motion control device is available from Galil Motion Control, Inc. of Sunnyvale, Calif. It also preferably has point-to-point interpolation and has incremental encoder feedback. It may preferably use the Mnemonic programming language. The motion control device interface 16 is designed to control the auto-indexing servomotor 20 in response to instructions received from the microcomputer 10.

The motion control device 16 is used to directly power the auto-indexing servomotor 20. The motor control interface accepts commands from the microcomputer 10 in order to properly position the servo 20. The servo 20 is connected by a mechanical coupling device to the auto-indexing punch and die, as described in more detail in connection with FIG. 4.

In the non-auto-indexing mode, the punch press is normally operated by a minicomputer 26, which may preferably be, for example, a Fanuc control station, Model No. 6M. That control station 26 is connected to the turret punch press 18 in a known manner and operates using known program code.

In operation, a typical turret punch press is controlled by means of normal program code executed by a minicomputer 26, such as the Fanuc Model 6M, referenced above. In the instant auto-indexing system, however, the microcomputer 10 is used as the control center. It is connected to the minicomputer 26 through a remote buffer 14 which preferably has a transfer rate of from 2400–19200 bits per second, using RS-232C or RS-422 protocols. Obviously, the remote buffer 14 must be compatible with the communication protocols of the minicomputer 26. In instances where the minicomputer 26 is a Fanuc Model 6M, the A&B protocols may be used by the remote buffer 14 to communicate with the minicomputer 26. As previously discussed, the microcomputer 10 is also connected to control the servomotor 20 by means of the motion control interface 16.

The program data 50 which is normally resident in the minicomputer 26 is instead resident in the microcomputer 10. The microcomputer then processes that data and transmits all normal non-auto-indexing instructions to the minicomputer 26, which operates the turret punch press 18 in the normal typical manner.

When the microcomputer 10 detects an auto-index command, it then sends the proper instructions to the minicomputer 26 to position the upper and lower turrets 22 and 24 at a "virtual station". After that, the microcomputer 10 issues an appropriate command (such as the ALL-STOP command) to the minicomputer 26 such that it ceases directing the operations of the turret punch press 18. The microcomputer 10 then sends the correct command to the servomotor 20 through the motion control device interface 16 in order to position the automatic-indexing servomotor 20. After the auto-indexing tools have been rotated to their desired position and locked therein, the microcomputer 10 then commands the minicomputer 26 to rotate the upper and lower turrets 22 and 24 back under the striker (not shown). At that time, the microcomputer 10 resumes executing the normal program code once again.

When no auto-indexing commands are detected, the microcomputer 10 merely passes all of the programmed data instructions directly to the minicomputer 26. However, as described above, when an auto-indexing command is detected, the microcomputer 10 generally executes the programmed instructions.

Figure 4:
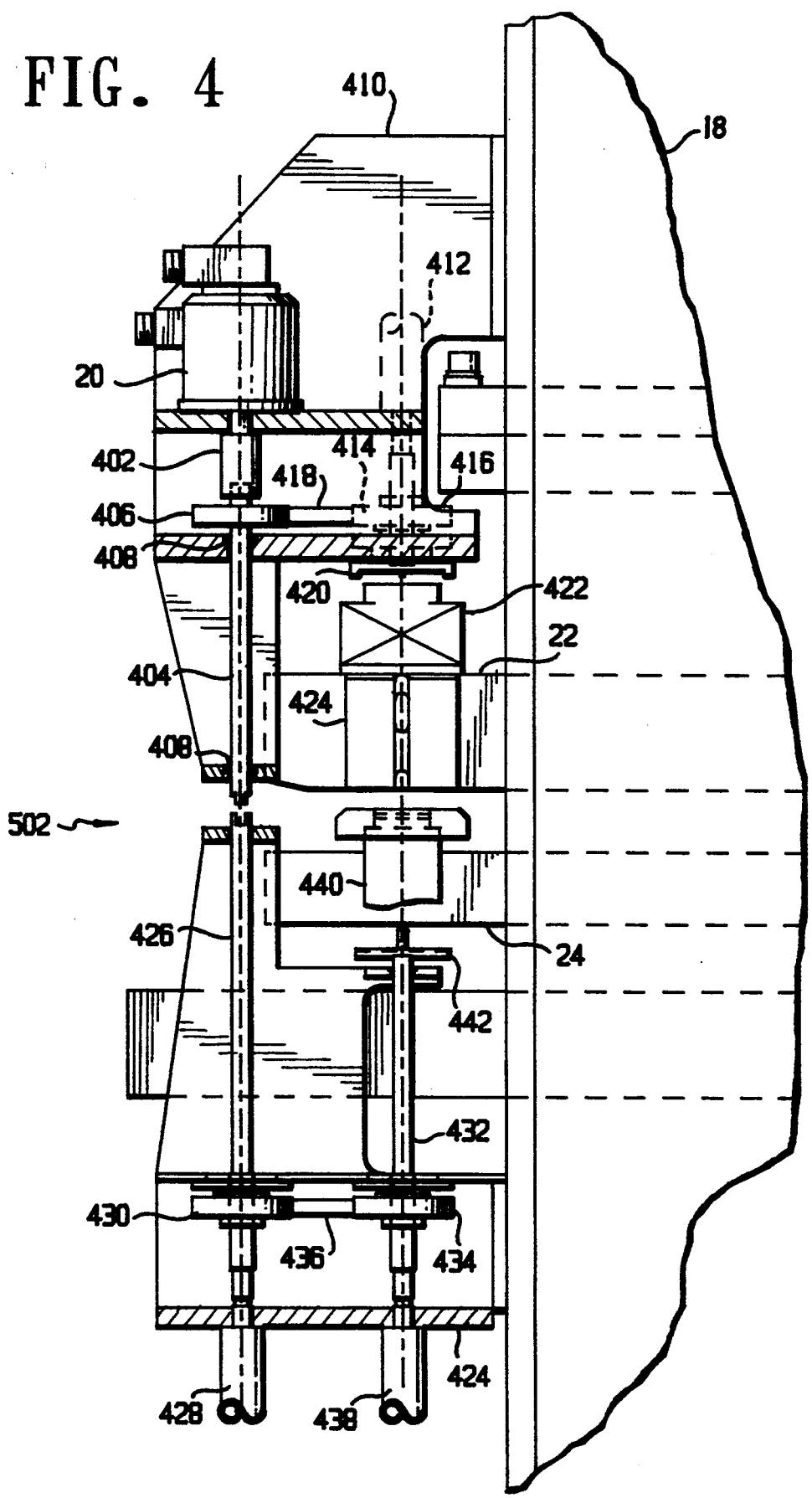
FIG. 4 is a diagram of a side view of many of the mechanical components of the retrofit auto-indexing apparatus of the present invention.

In order for the auto-indexing servomotor 20 to attain access to the mechanical assemblies, as discussed further in connection with FIG. 4, the upper and lower turrets 22 and 24 may be positioned at approximately 26° to an axis parallel to the long axis of the turret. That position is referred to in this specification as a "virtual station". Other positions may also be utilized. In order to accomplish that movement, the program code which operates the minicomputer 26 is modified such that, upon receiving an appropriate instruction from the microcomputer 10, the minicomputer 26 rotates the turrets 22 and 24 to the proper position. A set of indexing pins may be added to the turret punch press in order to secure the upper and lower turrets in that location, as shown and described in connection with FIG. 5. Such extra set of shot pins can be similar to what is typically used in the art to secure rotatable tools within a tool changer in place once it has been positioned. See, for example, U.S. Pat. No. 4,412,469, the disclosure of which is hereby incorporated herein.

Referring now to FIG. 3, there is shown a diagram of a flow chart of a program for use in operating the microcomputer 10. The method depicted in FIG. 3 is used to determine when an auto-indexing command has been detected and to take the appropriate steps to effectuate that command. The program starts at step 300 and initially opens the selected numerically controlled tool (NCT) G-Code file 302, which contains the instructions for operating the turret punch press 18. A line from the G-Code file is read at step 304 and then a determination is made at step 306 of whether the line of code which was just read indicates that it is the end of the selected NCT G-Code file. If an affirmative determination is made at step 306, then the selected file is closed at step 308 and the program ends at step 326.

If a negative determination is made at step 306, then a determination is made at step 310 of whether the line of code read from the G-Code file contains an auto-indexing command. If a negative determination is made at step 310, meaning that the program code does not contain an auto-indexing command, then the line of code is sent unchanged to the NCT controller at step 314, that is, the line of program code is sent to the minicomputer 26 for execution in a normal manner.

If an affirmative determination is made at step 310, meaning that the line of G-Code does contain an auto-indexing command, then a determination is made at step 312 of whether the line read from the G-Code file contains an original auto-indexing tool number. If an affirmative determination is made at step 312, that means that the auto-indexing command relates to the auto-indexing function contained as part of the originally delivered turret punch press 18. The instant inventive retrofit auto-indexing system can be used to add an additional auto-indexing station to those turret punch presses which already include an auto-indexing station or, as previously described, can be used to add one or more auto-indexing stations to a turret punch press which was manufactured and delivered without any auto-indexing capability.

If an affirmative determination is made at step 312, then the line read from the G-Code file is sent unchanged to the minicomputer 26, at step 314.

If a negative determination is made at step 312, meaning that the line read from the G-Code file contains an auto-indexing command but not for an original auto-indexing tool delivered with the turret punch press, then a determination is made at step 316 of whether the auto-indexing tool to which the line from the G-Code file refers is a retrofit auto-indexing station. If a negative determination is made at step 316, then an error message is displayed at step 320 and the selected NCT G-Code file is then closed at step 308.

If an affirmative determination is made at step 316, meaning that the current line read from the G-Code file relates to the retrofit auto-indexing station, then the virtual tool number is sent to the minicomputer 26, at step 318. The turret is then positioned at the correct angle. Then, the auto-indexing servomotor 20 is then commanded to achieve the correct angle at step 322 and the minicomputer 26 is sent the G-Code line which includes the original tool number, at step 324. In that manner, the microcomputer 10 causes the minicomputer 26 to set up the retrofit auto-indexing tool and to then move it back into position under the striker. The microcomputer 10 then instructs the minicomputer 26 to resume control of the operation of the turret punch press 18.

FIG. 4 is a diagram of a side view of many of the components of the retrofit auto-indexing system of the present invention. The system shown in FIG. 4 is designed such that the punch and die are rotated as a single unit by a single servomotor 20. The servomotor 20 is connected by means of a coupling 402 to a non-shifting drive shaft 404 which carries a timing pulley 406. The non-shifting drive shaft 404 rotates in bearings 408 in a known manner. All of the components 20 and 402–408 are located on the punch rotate frame 410 attached to the turret punch press 18.

The punch is rotated by means of the servomotor 20 and the non-shifting drive shaft 404 as follows. The punch rotate frame 410 is attached to the frame of the turret punch press 18 and carries a punch rotate air cylinder 412 which is coupled to a punch rotate shaft 414 which carries a punch rotate pulley 416 which is connected by means of a punch rotate belt 18 to the timing pulley 406 carried by the non-shifting drive shaft 404. The end of the punch drive shaft 414 opposite that of the air cylinder 412 is connected to a drive disk 420 which, upon actuation of the punch rotate air cylinder 412, engages with a punch rotate removable sleeve 422 which engages with the punch tool assembly 424 carried by the upper turret 22.

The die rotate assembly is carried by a die rotate frame 424 which is connected in a suitable manner to the frame of the turret punch press 18. A shifting shaft 426 is carried by suitable bearings (not shown) within the die rotate frame 424. The bottom of the die rotate shifting shaft 426 is coupled to a second air cylinder 428 which, when actuated, causes the shifting shaft 426 to move upward such that it engages the end of the non-shifting drive shaft 404, in a known manner. The bottom portion of the drive shaft 426 carries a second pulley 430 which is used to rotate a splined drive shaft 432 which ultimately positions the appropriate die tool carried by the lower turret 24.

The splined drive shaft 432 carries a third pulley 434 which is coupled to the second pulley 430 by means of a die rotate belt 436. In that manner, the output shaft of the drive servomotor 20 is coupled, when needed, directly to rotate both the punch and the die at exactly the same time for the exact number of degrees of rotation. A third air cylinder 438 is carried by the die rotate frame 424 and is actuated to move the splined shaft 432 into engagement with the guide tool assembly 440 carried by the lower turret 24. The upper portion of the splined shaft 432, that is, the portion opposite the end of that shaft which is engaged to the air cylinder 438, carries a drive rotate disk 442 which, when the air cylinder 438 is actuated, engages with the die tool assembly 440 for rotating the appropriate die tool.

In the manner as described above, both the selected punch and die tools are rotated through the exact same angle of rotation with a resolution of 0.01 degrees using only a single drive servomotor 20. In that manner, an indexing of 12 degrees between nibble cycles, can be obtained.

In operation, the servomotor 20 engages the punch and die assemblies using the mechanical couplings described. A frictional brake assembly, used for ensuring that the tools resist torque when not being indexed, is released. The tooling is then rotated by the gearing assembly described above to the desired angle, and the brake is then reengaged. The couplings initiated by the air cylinders 412, 428 and 438 are then disengaged, allowing the upper and lower turrets to move back into position. Ideally, the time from striker to striker should be less than 15 seconds.

Figure 5:
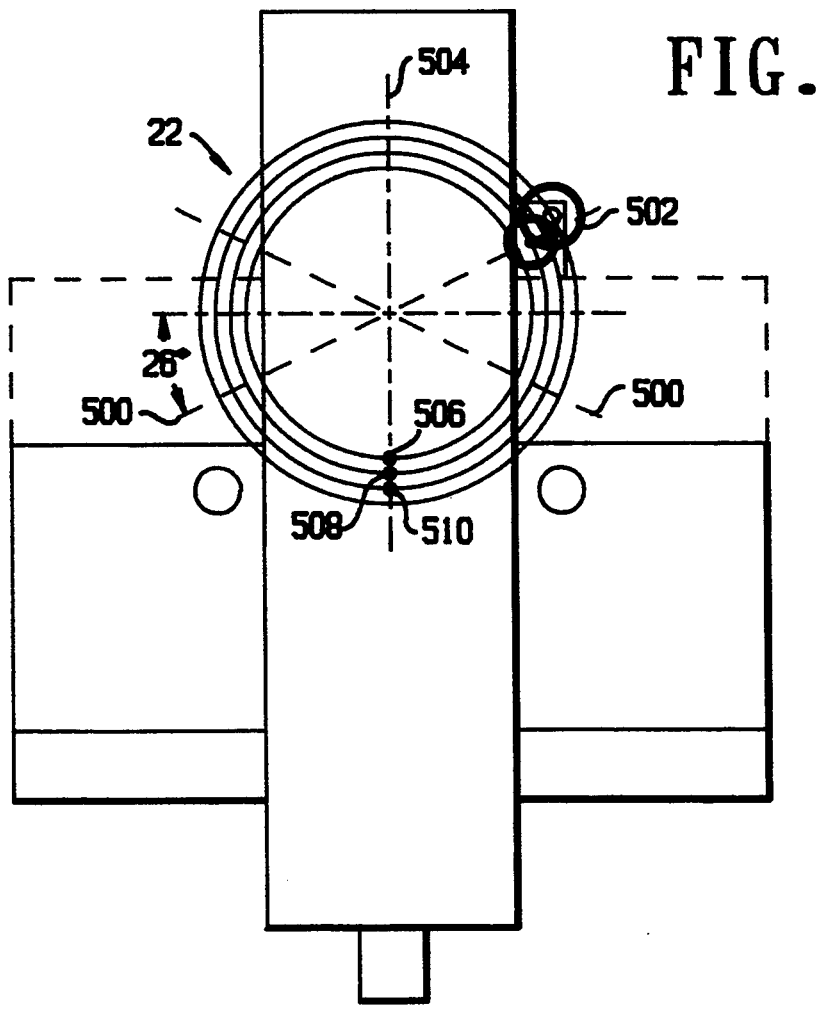
FIG. 5 is a diagram of a top view of a turret punch press showing the use of shot pins to secure the upper and lower turrets of the present invention when in a predetermined location.

FIG. 5 is a diagram of a top view of a turret punch press and shows the use of shot pins 500 which are used for securing an auto-indexing tool changer in position when it is not being indexed. The retrofit auto-index drive assembly 502, discussed in detail in connection with the description of FIG. 4, is secured to one side of the turret. The original NCT index pins 504 are used to secure the turret, as previously discussed. Each of the three turret tracks, inner 506, center 508 and outer 510 are also shown.

The retrofit auto-indexing system of the present invention, as will be known to those of ordinary skill in the art, provides many benefits. Such benefits include increased production and less tooling expense, as well as shorter set up times for operators of turret punch presses equipped with the auto-indexing system described herein. In addition, such turret punch presses require less programming for their operation, while at the same time providing increased flexibility with regard to the type of punching operations that can be performed.

By retrofitting an auto-indexing system to an existing turret punch press, even if it already utilizes a factory installed auto-indexing system, greater indexing capabilities can be provided, as well as multiple auto-indexing stations. The foregoing retrofit auto-indexing system can easily be installed on a customer's turret punch press at the customer's site and provide improved tool management techniques for the customer.

Although only a preferred form of the present invention has been illustrated and described, it should be understood that the invention is capable of modification by one skilled in the art without departing from the principles of the invention. Accordingly, the scope of the invention is to be limited only by the claims appended hereto.

I claim:

1. A method for operating a turret punch press of the type having rotatable upper and lower tool carrying turrets, each of those turrets carrying at least one auto-indexing tool changer, comprising the steps of:

storing in a first computer a set of programmed instructions for operating said turret punch press;

sequentially determining whether each instruction of said set of programmed instructions contains a command for said at least one auto-indexing tool changer;

transmitting each instruction which is determined not to contain an auto-indexing tool changer command to a second computer for execution of that instruction; and executing each instruction that is determined to contain an auto-indexing tool changer command such that said at least one auto-indexing tool changer is indexed.

2. The method of claim 1, further including the step of instructing an auto-indexing servomotor to increment said at least one auto-indexing tool changer to a desired angle of rotation.

3. The method of claim 1, further including the step of transmitting a portion of each instruction that is determined to contain an auto-indexing tool changer command to said second computer for executing said portion of said instruction.

4. The method of claim 2, wherein said step of instructing said servo motor to increment said at least one auto-indexing tool changer results in simultaneous rotation of tools carried on both of said upper and lower turrets by a similar predetermined degree of rotation.

5. A system for operating a turret punch press of the type having rotatable upper and lower tool carrying turrets, each of those turrets carrying at least one auto-indexing tool changer, comprising:
- a first computer for storing at least one set of programmed instructions for operating said turret punch press;
- means for analyzing each programmed instruction of said at least one set of programmed instructions in order to determine whether that programmed instruction contains a command for said at least one auto-indexing tool changer;
- a second computer connected to receive each programmed instruction that is determined not to contain a command for said at least one auto-indexing tool changer, said second computer executing each of the received programmed instructions to operate said turret punch press; and
- control means connected to said first computer for operating said at least one auto-indexing tool changer when said changer when said means for analyzing determines that a programmed instruction contains a command for said at least one auto-indexing tool changer.

6. The system of claim 5, wherein said control means increments said at least one auto-indexing tool changer to a desired angle of rotation.

7. The system of claim 5, wherein said control means includes a servomotor which causes said at least one auto-indexing tool changer to simultaneously rotate a selected tool on said at least one tool changer on both said upper and lower turrets through a similar degree of rotation.

8. A method for operating a non-indexing turret punch press of the type having rotatable upper and lower tool carrying turrets, each of those turrets carrying at least one auto-indexing tool changer, comprising the steps of:
- storing in a first computer a plurality of programmed instructions for operating said non-indexing turret punch press;
- sequentially determining whether each instruction of said plurality of programmed instructions contains a command for said at least one auto-indexing tool changer;
- transmitting each instruction which is determined not to contain an auto-indexing tool changer command to a second computer for execution of that instruction; and
- executing each instruction that is determined to contain an auto-indexing tool changer command such that said at least one auto-indexing tool changer is indexed.

9. The method of claim 8, further including the step of instructing an auto-indexing servomotor to increment said at least one auto-indexing tool changer to a desired angle of rotation.

10. The method of claim 9, wherein said step of instructing said servomotor to increment said at least one auto-indexing tool changer results in simultaneous rotation of tools carried on both of said upper and lower turrets by a similar predetermined degree of rotation.

11. The method of claim 8, further including the step of transmitting a portion of each instruction that is determined to contain an auto-indexing tool changer command to said second computer for executing said portion of said instruction.

* * * * *